May 12, 1964     F. G. POCZATEK     3,132,781
COLLAPSIBLE CARRIER DEVICE
Filed May 31, 1961     2 Sheets-Sheet 1
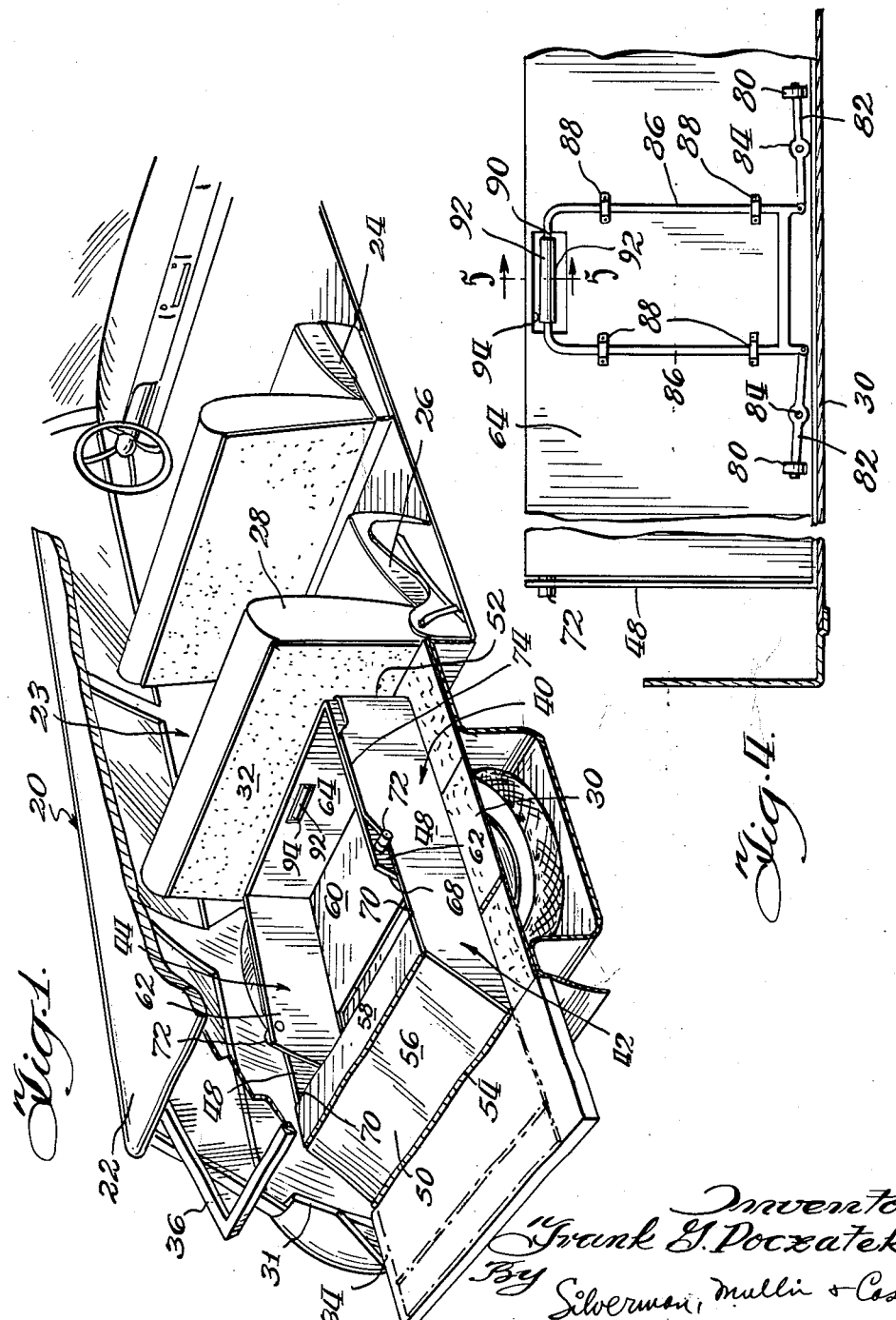
Inventor
Frank G. Poczatek
By Silverman, Mullin & Cass
Attorneys May 12, 1964 F. G. POCZATEK 3,132,781
COLLAPSIBLE CARRIER DEVICE
Filed May 31, 1961 2 Sheets-Sheet 2
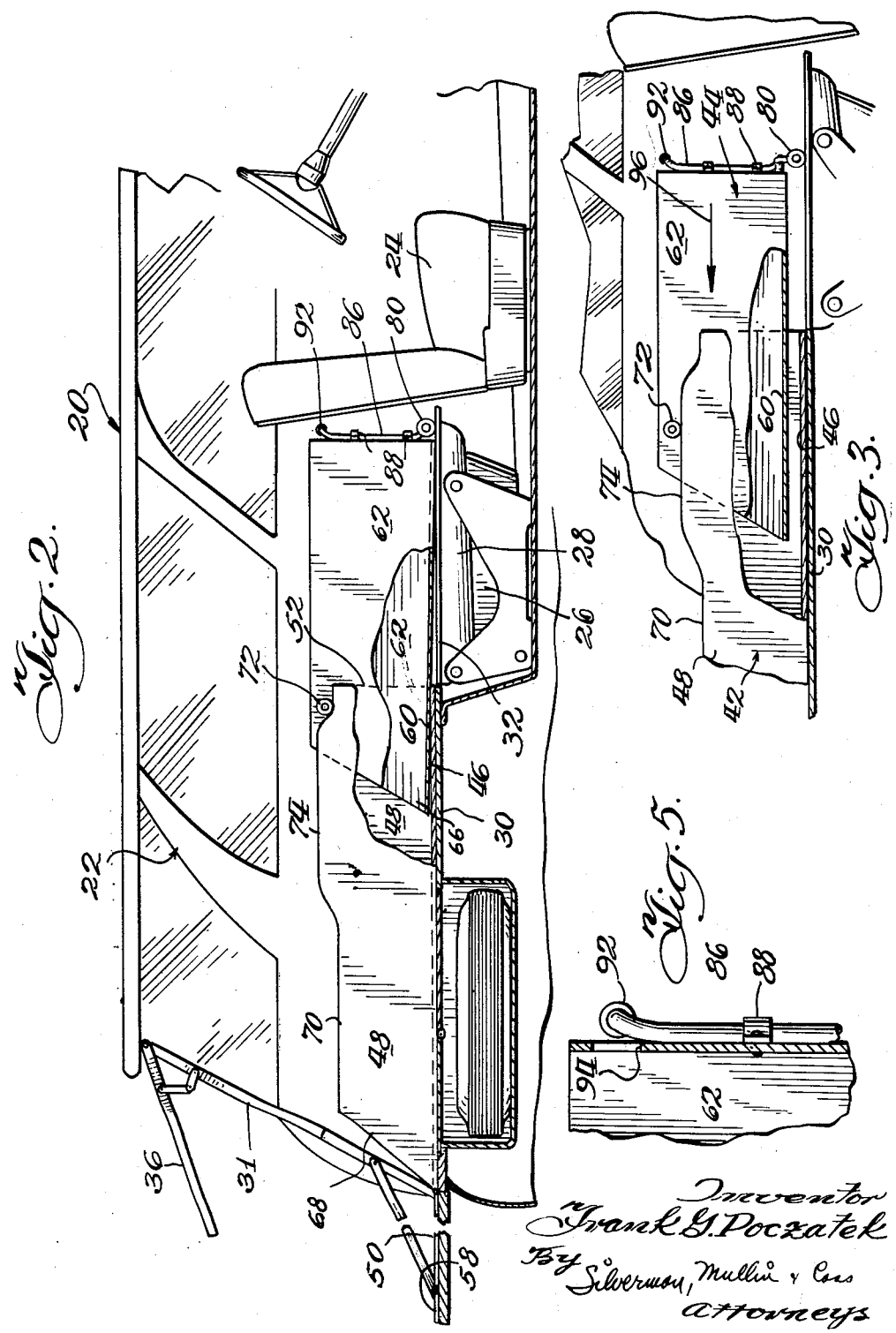

United States Patent Office 3,132,781
Patented May 12, 1964

3,132,781
COLLAPSIBLE CARRIER DEVICE
Frank G. Poczatek, 401 Oak St., Mount Prospect, Ill.
Filed May 31, 1961, Ser. No. 113,841
5 Claims. (Cl. 224—42.33)

This invention relates generally to a collapsible carrier device for use on the interior of vehicles and more particularly, relates to a device of the character described especially adapted for use in station wagons which can be enlarged selectively for increasing the load carrying capacity thereof.

The station wagon of conventional stock car manufacture has a rear storage compartment upon the deck of which is installed a seat having a back rest which can be folded or collapsed to a position substantially flush with said deck for increasing the available volume of storage space. Since the head room in such rear compartments is relatively limited, access to loads stored at the rear of the compartment oftentimes is inconvenient and especially from the rear tail gate of the station wagon. Consequently, it is somewhat difficult to load and unload such wagons from the tail gate thereof. With the rear seat of the vehicle unfolded, that is, being used, the available volume of space between the back rest and the rear end of the rear storage compartment is less and hence, the problems of loading and unloading the station wagon are eased accordingly. However, with the rear seat folded or collapsed and the additional storage space in use, loading and unloading of the vehicle can result in considerable inconvenience and even painful knocks to the person engaged in this pursuit.

The carrier device embodying the invention is especially suitable for obviating the foregoing problems as well as others which will be discussed. Said carrier device comprises a pair of container or tray members matingly assembled together for movement one relative the other in the direction of the length of the vehicle. In one condition of assembly thereof, the carrier device has an overall length which permits the same to be installed on the rear deck of the station wagon between the back rest of the rear seat and the tail gate of the vehicle. When the rear seat is collapsed or folded, one of said container members can be extended or moved outwardly of the second container member for increasing the load carrying capacity of the carrier device. In this second condition of assembly, the carrier device can occupy the space between the front seat of the vehicle and the tail gate.

Accordingly, it is a primary object of the invention to provide a collapsible carrier device of the character described which is capable of being used in the advantageous manner described hereinabove especially in vehicles of the station wagon type.

Another object of the invention is to provide a carrier device of the character described in which said container members have cooperating roller and track means for permitting movement of the inner container relative to the outer container of the pair without frictional engagement between the bottom walls of said container members.

Another important object of the invention is to provide a device as described which will protect the inside surfaces of the station wagon against scratching and marring while loaded. This advantage enables such dual-purpose vehicles to remain attractive and clean inside for passenger service as distinguished from cartage service in which used.

Another object of the invention is to provide a device as described in which said outer container has a foldable end wall which provides a flat bed supported on the tail gate of the vehicle for loading and unloading of the device and which can be folded to a position which does not obstruct the view of the driver to the rear of the vehicle when the device is loaded.

Another important object of the invention is to provide a carrier device of the character described in which the inner container member of the pair has retractile anti-friction means adapted to bear against the rear deck of the vehicle during relative movement between said two container members.

Other salutary objects of the invention reside in providing a collapsible carrier device as described which is very economical to manufacture, which is readily operated from the interior of the rear compartment of the vehicle, which can be loaded advantageously from exterior of the vehicle, placed in the vehicle and then expanded in size thereof to said second position of assembly therefor conveniently to load the rear of the storage compartment of the vehicle, and which can be left in the vehicle without interfering with normal use thereof.

The foregoing and other objects of the invention will become apparent from the ensuing description in which a preferred embodiment has been described in detail in the specification and illustrated in the accompanying drawings. It is contemplated that minor variations in the size, arrangement, construction and proportion of the several parts of the invention may occur to the skilled artisan without departing from the scope or sacrificing any of the advantages thereof.

In the drawings:

FIG. 1 is a fragmentary perspective view of a representative vehicle of the station wagon type with portions thereof broken away and showing the collapsible carrier device embodying the invention installed in the rear storage compartment of the vehicle in the collapsed condition thereof.

FIG. 2 is a fragmentary side elevational view of said vehicle with portions broken away and showing said carrier device installed in the expanded condition thereof in the rear compartment of the vehicle, the rear seat of which has been folded or collapsed.

FIG. 3 is a fragmentary side elevational view similar to that of FIG. 2 and showing the manner in which movement of the inner member relative to the outer member of the device is accomplished for collapsing the carrier device, portions of the device being broken away to show details.

FIG. 4 is a fragmentary rear elevational view of said carrier device and showing the rectractile anti-friction means provided on the inner member of said device.

FIG. 5 is a fragmentary sectional view taken along the line 5—5 of FIG. 4 and in the general direction indicated.

Referring now to the drawings, the reference character 20 identifies a representative vehicle of the station wagon type. The body 22 of the vehicle defines a compartment designated generally 23 to the rear of the front seat 24 of the vehicle. The rear seat 26 of the vehicle is installed in said compartment 23 behind the front seat 24, said seat 26 having a back rest 28 hingedly connected thereon which permits movement of the back rest between an upright position for use of the seat 26, as seen in FIG. 1, and folding thereof to a collapsed position as seen in FIG. 2. The compartment 23 has deck 30 which extends rearwardly from the seat 26 toward the open back end 31 of the compartment and the back rest 28 has a panel 32 secured thereon which can be aligned substantially flush with the deck 30 in the folded condition of the back rest, as seen in FIG. 2. The body 22 has a hinged tail gate 34 at the open rear end 31 thereof and a rear window 36 hingedly connected to the body for cooperating with the tail gate 34 to close off the open rear end 31 of the body 22. Other structural features of the vehicle 20 which have been illustrated need not be described in detail since they have no material bearing on the invention.

As seen in FIG. 1, rear compartment 23 of the vehicle extends from the back rest 28 to the open rear end 31 of the body adjacent the tail gate 34. In FIG. 2, the back rest 28 has been folded to a stored position wherein the panel 32 is flush with deck 30 so that the compartment 23 now extends from the front seat 24 to said open rear end 31. Obviously, the available storage capacity of the compartment 23 as illustrated in FIG. 2 has been increased over that illustrated in FIG. 1.

The collapsible storage device embodying the invention has been identified generally by the reference number 40. Said device 40 is comprised of a pair of container or tray members 42 and 44 adapted to be telescopically or matingly assembled together disposed one within the other. The tray members 42 and 44 may be constructed of any of a variety of materials, such as paperboard, wood, metal, plastic and the like or combinations of materials. Both of the containers are of generally rectangular configuration open at the upper ends thereof respectively. The outer tray 42 has a bottom wall 46, a pair of upstanding, parallel side walls 48 and an end wall 50, the end 52 opposite said end wall 50 being open. The end wall 50 is hingedly connected as at 54 along an edge of the bottom wall 46 and comprises a pair of hingedly connected flaps or leaves 56 and 58. The length of the tray 42 is selected so that when installed as shown in FIG. 1, it extends from the back rest 28 to the rear end 31 of the compartment 23 and the width thereof is only less than the width of said compartment sufficiently to permit insertion thereof into the compartment 23 through open end 31.

The tray 44 has a bottom wall 60, a pair of upstanding parallel side walls 62 and an end wall 64, the end 66 thereof opposite said wall 64 being open. The transverse dimension of the tray 44 is selected to permit the same to be slidably assembled on the inside of the outer tray 42 and the length of tray 44 is somewhat shorter than the length of the outer tray. When the trays are assembled together, the end wall 64 of the inner tray 44 is opposite the end wall 50 of the outer tray.

Considering FIG. 1, the tray 44 is seated on the interior of tray 42 with end wall 64 thereof in substantial registry with the open end 52 of the outer tray 42. The end wall 50 of tray 42 is shown folded upwardly to a closed position wherein the flap or leaf 56 is engaged against the canted edges 68 of side walls 48 and the leaf 58 is supported on the upper edges 70 of said walls 48. The leaf or flap 58 may be made shorter than the leaf or flap 56 so as to permit same to be folded inwardly against the flap 56 between the walls 48. To load the device 40, the end wall 50 can be lowered to the dotted line position thereof in FIG. 1 wherein the flaps 56 and 58 rest on the tail gate 34 to provide an even, regular surface or bed at the entrance to the device through open end of the inner tray 44 (best seen in FIG. 2). Since the tail gate 34 is relatively wide, the folding arrangement of the flaps 56 and 58 does not result in any obstruction of the view of the driver while at the same time permitting the flat bed on the tail gate to be achieved.

Secured on each of the side walls 62 of the inner tray 44 and extending outwardly is a roller member 72, said roller 72 being spaced inwardly of the canted edge 68 and adjacent the upper edge of the said wall 62 so as normally to engage upon the upper edge 70 of wall 48. Each wall 48 has a flat dwell or track portion 74 extending upwardly from the upper edge 70 and intermediate the opposite extremities of said edge 70. Referring to FIG. 3, by moving the inner tray 44 outwardly through the open end 52 of the inner tray, the rollers 72 will ride upon the dwell or track 74 and cause the tray 44 to be lifted from the bottom wall 46 of the outer tray 42. When the tray 44 has been moved the desired distance outwardly of the inner tray, the rollers 72 will again drop to the upper edge 70 of walls 48 on the opposite side of said track 74 to permit the bottom walls of the trays to become engaged once again. Causing the bottom walls of the trays to be displaced one relative to the other during such movement extending the device avoids dragging and frictional engagement between the bottom walls of the trays. It may be considered that the edge portions 70 of walls 48 are grooves or depressions in the track or dwell portions 74 which limit or restrict relative movement between the trays in the direction of their lengths respectively.

Referring to FIGS. 4 and 5, to further assist in convenient movement of the trays one relative to the other, there is secured on the outside of end wall 64 of the inner tray a pair of wheels 80 each mounted for rotary movement upon an axis perpendicular to the length of the tray 44 or parallel with the wall 64. The axis of each wheel 80 is represented by the pin 82 having a wheel 80 on one end thereof and which is pivotally mounted intermediate the ends thereof upon the wall 64 as indicated at 84. The opposite end of each pin 82 is connected to the free extremity of a rod or bar 86 which slidably is secured to the wall 64 by clamps or straps 88. The opposite ends of said bars 86 are connected by a transverse bar 90 disposed adjacent the upper edge of the wall 64. A hand grip member 92 may be secured on the bar 90. The bars 86 and 90 form a U-shaped member.

Opposite the hand grip 92 of bar 90 and adjacent the upper edge of wall 64 is an enlarged aperture 94. The operator can insert a hand into the aperture 94 and lift upwardly on the hand grip 92 and tray 44. This action will lift the bars 86 and cause the pins 82 to pivot so as to lower the wheels 80. As seen in FIG. 3 where the tray 44 is being moved inwardly into the tray 42 in the direction of the arrow 96, the rollers 72 ride on the track portions and the end of tray 44 at wall 64 thereof rides on the wheels 80 during collapsing of the device. Of course, the operator holds the inner end of the tray 44 up during the collapsing of the device.

The device 40 is capable of being used in any one of many different manners to obtain the advantages of the structure thereof. The device can be used in its collapsed condition, as seen in FIG. 1, by loading and unloading the same bodily relative the vehicle or by placing same in the vehicle and loading the device through the open rear end of the vehicle. The device can be installed in the vehicle in the collapsed condition thereof either with the tray 44 loaded or unloaded. Where unloaded, the tray 44 can be loaded and then, after folding the seat 26 by collapsing back rest 28, the tray 44 can be lifted and extended to the open position of the device 40 illustrated in FIG. 2. This will expose the tray 42 for loading. For unloading the device, first the tray 42 can be unloaded and then, the tray 44 can be telescoped within the tray 42 for more convenient access from the open rear end of the vehicle. Movement of the tray 44 relative the tray 42 is easy and rapid by reason of the rollers 72 and wheels 80 because the bottom wall of tray 44 does not frictionally engage the bottom wall of the outer tray 42 during the movement. When the desired relative movement between the trays 42 and 44 is completed, the rollers will be engaged with the edges 70, as explained wherein the bottom walls of the trays 42 and 44 will be engaged.

It is believed that the invention has been described in sufficient detail to enable the skilled artisan to understand and practice the same. The invention as pointed out in the claims hereto appended is intended to be broadly construed commensurate with the progress in the arts and sciences contributed thereby.

What it is desired to secure by Letters Patent of the United States is:

1. A collapsible carrier structure of the character described comprising, an outer tray and an inner tray slidably engaged on the interior of the outer tray, each tray opening upwardly and having a bottom wall and parallel side walls upstanding along opposite edges of the bottom wall, said outer tray having an open end through which said inner tray is slidable for extending and collapsing said structure, said side walls having cooperating means for vertically displacing the bottom walls out of contact with the other during said sliding movement of the inner tray, said cooperaing means comprising, roller means on said inner tray and track means on said outer tray, said track means comprising flat dwell portions along the upper edges of the side walls of said outer tray arranged to be engaged by said roller means for moving the bottom walls out of contact one with the other during said sliding movement.

2. A collapsible carrier structure of the character described comprising, an outer tray and an inner tray slidably engaged in the interior of the outer tray, each tray opening upwardly and having a bottom wall and parallel side walls upstanding along opposite edges of the bottom wall, said outer tray having an open end through which said inner tray is slidable from a retracted position to an expanded condition, said side walls having cooperating means for vertically displacing the bottom walls out of contact one relative to the other during said sliding movement of said inner tray from said retracted position to said expanded condition, said cooperating means comprising, roller means extending outwardly of said side walls of the inner tray and engaged with the upper edges of the side walls of the outer tray, said side walls of the outer tray having elevated track means along said upper edges thereof for vertically displacing said bottom walls when engaged by said roller means whereby said inner tray is rendered easily movable with respect to said outer tray.

3. A collapsible carrier structure for use in a station wagon vehicle having a rear storage compartment provided with a deck and a seat member having a hingedly connected back rest adapted to be folded to a position substantially flush with said deck for increasing the storage capacity of said compartment, said structure comprising, an inner and outer container each open at the upper end thereof having bottom walls and matingly engaged one within the other, the outer container of the pair having an open end through which the inner container of the pair is slidable from a retractile position to an expanded position selectively increasing and decreasing the storage capacity of said structure, each container having a pair of upstanding side walls having cooperating roller and track means for displacing the containers in a vertical direction one relative the other during said sliding movement of the inner container of the pair from one position to the other, said containers having their bottom walls in contact at all other times to prevent movement therebetween, said roller means being on the inner container and the track means being on the outer container, said track means comprising a portion of the upper edge of each side wall of the outer container, said portion being elevated intermediate the opposite extremities of said upper edge.

4. A structure as described in claim 3 in which said inner container has an end wall in registry with the open end of the outer tray having retractile wheel means adapted to be rolled on said deck during said sliding movement of the inner container relative to the outer container.

5. A structure as described in claim 3 in which said outer container has an end wall opposite said open end thereof, said end wall of the outer container being hingedly connected to the bottom of the container and comprising a pair of flaps hingedly connected together, which in their unfolded condition form a protective floor for said deck during loading and unloading.

References Cited in the file of this patent

UNITED STATES PATENTS

| | | |
|---|---|---|
| 433,516 | Charles et al. | Aug. 5, 1890 |
| 2,456,817 | Davenport | Dec. 21, 1948 |
| 2,539,103 | Robinson | Jan. 23, 1951 |
| 2,953,244 | Phillips | Sept. 20, 1960 |
| 3,004,678 | Golaski | Oct. 17, 1961 |